United States Patent [19]

Brachet et al.

[11] 4,383,742

[45] May 17, 1983

[54] METHOD AND APPARATUS FOR CREATING THE ILLUSION OF MOVING IMAGES

[76] Inventors: Roland Brachet, Domaine d'Arnaga, 83810 Callian; Pierre Boismard, 10, Rue De Castellane, 75008 Paris, both of France

[21] Appl. No.: 201,033

[22] Filed: Oct. 27, 1980

[30] Foreign Application Priority Data

Oct. 29, 1979 [FR] France .............................. 79 26723

[51] Int. Cl.³ .............................................. G03B 25/00

[52] U.S. Cl. ...................................... 352/100; 40/463; 40/541; 40/902

[58] Field of Search ................. 352/100; 40/902, 541, 40/463

[56] References Cited

U.S. PATENT DOCUMENTS

| | | | |
|---|---|---|---|
| 917,587 | 4/1909 | Good | 352/100 |
| 978,854 | 12/1910 | Czerniewski | 352/100 |
| 2,026,753 | 1/1936 | Rosenthal et al. | 352/100 |
| 2,299,731 | 10/1942 | Arendt | 352/100 |
| 3,694,062 | 9/1972 | Koenig | 352/100 |
| 3,704,064 | 11/1972 | Sollogoub et al. | 352/100 |
| 3,951,529 | 4/1976 | Gandia | 352/100 |
| 4,179,198 | 12/1979 | Brachet et al. | 352/100 |

FOREIGN PATENT DOCUMENTS 7709086 10/1978 France .

*Primary Examiner*—Alan Mathews

*Attorney, Agent, or Firm*—Sandler & Greenblum

[57] ABSTRACT

Apparatus for generating an animated image when viewed from a location in motion. The apparatus comprises a series of images; and at least one illumination device for emitting light flashes adapted to illuminate the images. Ignition devices are provided for causing a light flash to be emitted each time the location has moved a distance substantially equal to the spacing between two successive images. The illumination device is fixed relative to the images and is adapted to simultaneously illuminate an entire section including the series of images.

A method of providing an animated image for viewing by a viewer at a location in motion relative to a series of stationary images. The method includes sensing the velocity of motion of the location relative to the series of images. A series of the images is illuminated for viewing from the location as the location moves past the images. The illumination device for flash illuminating the images is fixed relative to the images. The illumination device is ignited as a function of the relative velocity of the location whereby the illumination device is ignited each time the location is moved a distance equal to the spacing between the images.

8 Claims, 2 Drawing Figures

METHOD AND APPARATUS FOR CREATING THE ILLUSION OF MOVING IMAGES

BACKGROUND OF THE INVENTION

1. Field of the Invention

The invention relates to an installation for use in dark and relatively unattractive places, such as tunnels, and particularly in underground subway and railway systems, which creates an image or impression of moving images to passengers on the train.

2. Description of Prior Art

French Pat. No. 77 09 086 of Mar. 25, 1977 discloses an installation comprising a series of pictures to be mounted along the inner wall of a tunnel at regular intervals, a set of devices for the emission of flashes of light, mounted on the train and facing toward the lower wall, and means for actuating flashing devices intermittently and whenever the train has covered a distance equal to the gap between two successive pictures.

By virtue of such an arrangement, the installation makes it possible for all of the passengers, regardless of their respective positions in a given train, to see an illuminated picture and to receive the same impression of a projection of still or moving pictures, with no particular position in the vehicle being any more advantageous than any other.

Previous inventions such as those disclosed in U.S. Pat. Nos. 3,704,064 and 3,694,062, propose installations comprising a series of pictures representing a multiplicity of consecutive movements. The pictures are attached to the interior wall of a tunnel and each of the pictures is provided with its own electronic flash which is individually energized as the train moves.

Installations of this type offer virtually no advantage since, not only is their cost prohibitive, but further because only from certain vantage points in a given train can the desired effect be created and appreciated.

SUMMARY OF THE INVENTION

It is, therefore, an object of the invention to provide an installation offering numerous advantages, and particularly an installation that can be made at moderate cost, and which, above all, may be seen by all the passengers, who are able to see the projected impression, which was not possible with previous systems.

It is a further object of the invention to provide an installation for producing images and impressions of moving pictures or images offering the same advantages as those disclosed in French Pat. No. 77 09 086 but having a lower initial installation cost per passenger.

According to the invention an apparatus for generating an animated image when viewed from a location in motion is provided. The apparatus comprises a series of images and at least one illumination device for the emission of light flashes adapted to illuminate the images. Ignition means are provided for causing a light flash to be emitted by the illumination device each time the location has moved a distance substantially equal to the spacing between two successive images. The illumination device for emitting the light flashes is fixed relative to the images and is adapted to simultaneously illuminate a series of the images.

According to the invention a method of providing an animated image for viewing by a viewer at a location in motion relative to a series of stationary images is disclosed. The method comprises sensing of the velocity of motion of the location relative to the series of images; and flash illuminating a group of the images for viewing from the location as the location moves past the images, the illumination means for flash illuminating the images being fixed relative to the images. The illumination means is ignited as a function of the velocity of the location whereby the illumination means is ignited each time the location is moved a distance equal to the spacing between consecutive images.

BRIEF DESCRIPTION OF DRAWINGS

The invention will now be described in greater detail with reference to one embodiment of the invention, given by way of example only, in the annexed drawings in which.

DESCRIPTION OF PREFERRED EMBODIMENTS

The present invention relates to an animated image or moving picture installation for use in a railway or other dark or underground systems having a train or other vehicle travelling through a tunnel. A series of images or pictures is mounted along the interior wall of the tunnel and at least one illumination device for the emission of flashes of light is provided. Ignition means are also provided for causing a flash of light to be emitted each time the vehicle has covered a distance equivalent to the gap between two successive images. The flash device or devices are fixed and are designed to simultaneously expose an entire section comprising a series of images.

By virtue of this arrangement, a very simple installation is obtained, which installation may be of the modular type and may be easily installed in all kinds of tunnels and at various locations without recourse to any special installation means. Such a system obviates the use of special means positioned on the train or vehicle itself as well as on the track.

According to the invention, means may be provided which are fixed in the tunnel for actuating or igniting the flash device and which produce control signals via a signal device which senses and responds to the velocity of the train.

Finally, according to a preferred embodiment, the installation comprises an emitter adapted to emit a beam of electromagnetic radiation in the form of radioelectric waves, a receiver adapted to receive the waves reflected off the train in motion, a master oscillator connected to the emitter through an amplifier, a heterodyne device (mixer) adapted to receive signals from the emitter as well as the reflected signals and adapted to produce an interference beat having a frequency corresponding to the difference between the frequency of the reflected waves and the frequency of the emitted waves. The beat is converted into synchronous control pulses sent to the flash emitting device. The wavelength of the control pulses is equal to the interval between the successive pictures, images, photographs or the like affixed to the wall.

Figure 1:
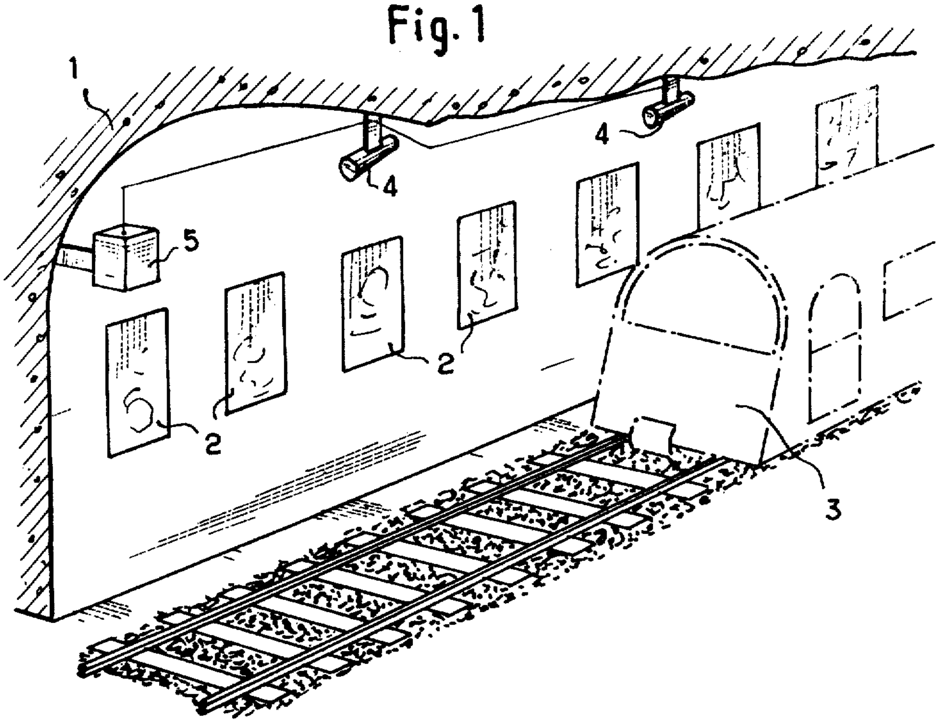
FIG. 1 schematically illustrates an installation according to the invention in perspective.

FIG. 1 schematically illustrates a tunnel 1 such as may be found in urban underground subway systems through which a train 3 travels. The sidewall of the tunnel is provided with images in the form of photographs, drawings or pictures 2 such as advertising posters, all showing substantially the same objects but in the successive positions required to produce an impression of moving pictures or animated images when viewed from a moving train. The distance between any two adjacent pictures remains constant from the beginning to the end of the series.

The section of tunnel shown is provided with two illumination devices (strobes) for emission of light flashes such as gas discharge tubes, for example. These strobes are oriented so as to light up the entire section of tunnel provided with the series of pictures 2. The flash emitters 4 are energized in such a manner so as to cause them to operate simultaneously.

An emitter-receiver 5 is attached to the tunnel 1 and is capable of directing a beam of electromagnetic radioelectric waves towards the train 3 and to receive in turn a reflected wave of a different frequency as the waves are reflected off the moving train by the Doppler Fizeau effect. The wavelength of radiation emitted is equal to the distance between any two successive pictures on the interior wall of the tunnel.

Figure 2:
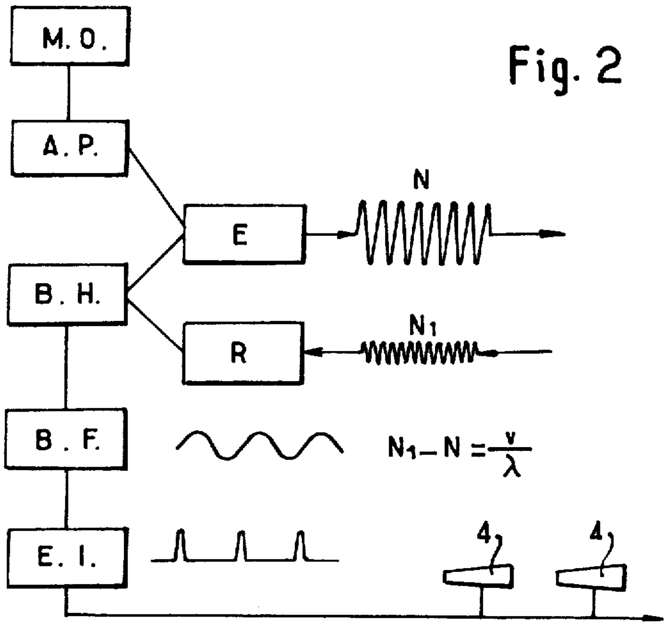
FIG. 2 is a schematic diagram of the installation for igniting the strobes.

The emitter-receiver 5 comprises a master oscillator MO (FIG. 2) which, by a power amplifier AP acts on the emitter E which radiates a wave having a frequency N. This wave is reflected from the front of the first carriage of the train. The reflected wave has a frequency N1 which differs from the frequency N.

The return radiation, of far smaller amplitude, is received by the receiver R. The emitter E and receiver R are connected to a heterodyne beat device BH which receives the signals of the frequencies N and N1 and processes the interference speed of the frequency N1-N. The interference beat is then sent to a low frequency amplifier BF. The BF signal is shaped and converted into synchronous pulses by means of an ignition pulse emitter (shaper) E1 so as to provide a signal having clearly defined characteristics.

The frequency of the beat pulse is, according to established principals, such that between two successive pulses the train has moved forward by a distance corresponding to one wavelength. The wavelength is selected such that it is equal to the distance between two successive pictures on the wall. The pulse emitter E1 thus directly ignites the emission of the synchronized flashes.

The above device is very simple and reliable. The entire installation can advantageously be designed as a "module" so that it can be taken down without difficulty and removed from the location on the railway line where it was previously used and then installed at a different location on the line.

The above installation makes it possible for all the passengers on the train to look at the wall of the tunnel and receive the impression that interrelated scenes forming a moving picture are accompanying them.

Although the invention has been described with respect to particular means and apparatus, numerous modifications as to details as well as the use of equivalent means may quite obviously be used without departing from the scope of the invention. Thus, the ignition means for actuating the flash emitting device, for example, could be replaced by some other means such as one which measures the speed of the train and, by means of a microprocessor, processes the periodicity with which the flashes are to recur; the periodicity being the quotient of the distance between successive pictures over the speed measured.

What is claimed is:

1. An apparatus for generating an animated image when viewed from a location in motion, said apparatus comprising:

(a) a series of images;

(b) an illumination device for the emission of light flashes adapted to illuminate said images;

(c) ignition means for causing a light flash to be emitted each time the location has moved a distance substantially equal to the spacing between two successive images;

(d) signal means for sensing and measuring the velocity of movement of said location relative to said series of images, said signal means being operatively associated with said ignition means whereby a light flash is generated each time said location has moved a distance equal to the spacing between two successive images in said series.

2. An apparatus for generating an animated image when viewed from a location in motion, said apparatus comprising:

(a) a series of images;

(b) an illumination device for the emission of light flashes adapted to illuminate said images;

(c) ignition means for causing a light flash to be emitted each time the location has moved a distance substantially equal to the spacing between two successive images; and (d) signal means for sensing the velocity of movement of said location relative to said series of images, said signal means being adapted to transmit an electromagnetic signal and receive return radiation reflected from said location to provide an ignition pulse for activating said ignition means each time said location has moved a distance substantially equal to the spacing between two successive images.

3. A method of providing an animated image for viewing by a viewer at a location in motion relative to a series of stationary images, said method comprising the steps of:

(a) sensing and measuring the velocity of motion of said location relative to said series of images;

(b) flash illuminating said images for viewing from said location as said location moves past said images with illumination means, the illumination means for flash illuminating said series of images being fixed relative to said images; and (c) igniting said illumination means as a function of the relative sensed and measured velocity of said location whereby said illumination means is ignited each time said location is moved a distance equal to the spacing between said images of said series.

4. A method for providing an animated image for viewing by a viewer at a location in motion relative to a series of stationary images, said method comprising steps of:

(a) sensing the velocity of motion of said location relative to said series of images by transmitting an electromagnetic signal and receiving the return signal reflected from said location to determine the velocity of the location relative to said image;

(b) flash illuminating said images for viewing from said location as said location moves past said images with illumination means, the illumination means for flash illuminating said images being fixed relative to said images; and (c) igniting said illumination means as a function of the relative velocity of said location whereby said illumination means is ignited each time said location is moved a distance equal to the spacing between said images of said series.

5. An apparatus for generating an animated image when viewed from a location in motion, said apparatus comprising:

(a) a series of images;

(b) at least one illumination device for the emission of light flashes adapted to illuminate said images, wherein said illumination device is fixed relative to said images and is adapted to simultaneously illuminate an entire section, including the series of said images;

(c) ignition means for causing a light flash to be emitted each time the location has moved a distance substantially equal to the spacing between two successive images; and (d) signal means fixed relative to said series of images for generating a signal corresponding to the velocity of said location, said signal means comprising sensing means for sensing the velocity of movement of said location relative to said images, and said sensing means further comprising an emitter adapted to transmit a beam of electromagnetic radiation towards said location, a receiver adapted to receive radiation reflected away from said location while in motion, and a master oscillator connected to said emitter through an amplifier, and wherein said signal means is operatively associated with said ignition means whereby a light flash is generated each time said location has moved a distance equal to the spacing between two successive images in said series.

6. A method of providing an animated image for viewing by a viewer at a location in motion relative to a series of stationary images, said method comprising the steps of:

(a) sensing the velocity of motion of said location relative to said series of images by emitting a beam having a frequency corresponding to the spacing between said images, receiving radiation reflected back from said moving location, and mixing the frequencies of the emitted and reflected radiation to generate a beat signal having a periodicity such that said location moves a distance equal to the spacing between two consecutive beat pulses;

(b) flash-illuminating a series of said images for reviewing from said location as said location moves past said images with illumination means, the illumination means for flash-illuminating said series of images being fixed relative to said images; and (c) igniting said illumination means as a function of the relative velocity of said location, whereby said illumination means is ignited each time said location is moved a distance equal to the spacing between said images of said series.

7. The apparatus as defined by claim 1 further comprising an amplifier for amplifying said low frequency interference beat.

8. The apparatus as defined by claim 7 wherein said ignition means is connected to receive said amplified interference beats so as to provide a signal having a wavelength equal to the interval between successive images attached to said wall.

* * * * *